Figure 1:
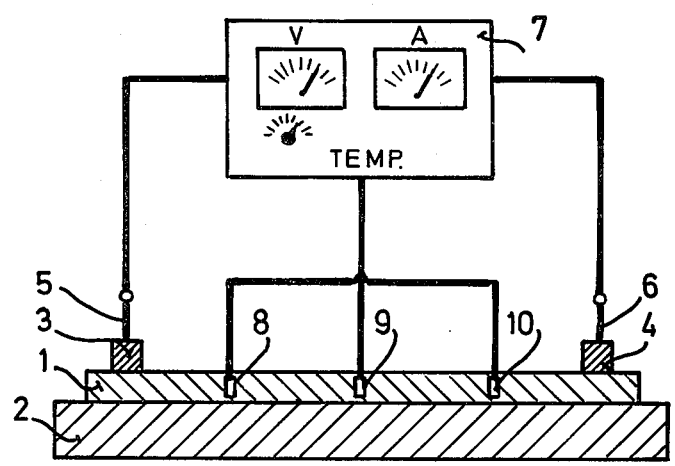

United States Patent [19]
Davies

[11] 3,915,827
[45] Oct. 28, 1975

[54] METHOD IN ELECTROPHORESIS FOR CONTROLLING THE SUPPLIED POWER SO AS TO OBTAIN SEPARATIONS AT AN OPTIMUM SPEED

[75] Inventor: Hilary E. W. Davies, Stockholm, Sweden

[73] Assignee: LKB-Produkter AB, Bromma, Sweden

[22] Filed: Jan. 24, 1974

[21] Appl. No.: 436,353

[30] Foreign Application Priority Data
Jan. 24, 1973 Sweden .............................. 7300950

[52] U.S. Cl. ............................ 204/180 G; 204/299
[51] Int. Cl.² ........................................... B01K 5/00
[58] Field of Search......... 204/180 G, 180 R, 180 S, 204/299

[56] References Cited
UNITED STATES PATENTS

| | | | |
|---|---|---|---|
| 3,630,882 | 12/1971 | Dilworth | 204/299 |
| 3,649,498 | 3/1972 | Pretorius et al. | 204/180 G X |
| 3,694,335 | 9/1972 | Pretorius et al. | 204/180 G X |
| 3,705,845 | 12/1972 | Everaerts | 204/299 X |

Primary Examiner—John H. Mack
Assistant Examiner—A. C. Prescott

[57] ABSTRACT

A method for decreasing the time required for accomplishing isoelectric focusing in conducting electrophoretic separation consists in continuously regulating the amount of electrical energy supplied by means of temperature responsive sensors placed in contact with the sample.

4 Claims, 2 Drawing Figures

U.S. Patent  Oct. 28, 1975  3,915,827

METHOD IN ELECTROPHORESIS FOR CONTROLLING THE SUPPLIED POWER SO AS TO OBTAIN SEPARATIONS AT AN OPTIMUM SPEED

In electrophoresis, an ionized sample is separated by supplying it to an electrolyte within which two electrodes are arranged, the fractions of the sample then being separated with respect to their mobility in the electrical field. The electrolyte and the sample are usually arranged in some stabilizing medium, e.g., a gel. The separation can take place either in a separation column or in a gel layer arranged on a plate. A special method for electrophoresis is the so-called isoelectric focusing wherein the electrolyte forms a pH-gradient and the fractions of the sample have different charges at different pH-values, the fractions thus migrating towards a point within the electrolyte where the charge is zero, the so-called isoelectrical point.

To the electrodes used in the separation, a constant current or a constant voltage is usually supplied, the current or voltage values being chosen as high as possible in order to speed up the separation. However, the power supplied must be limited in order to avoid that, nowhere within the separation medium during the separation, will the power developed rise to such a high temperature that the sample is damaged. In order to avoid this, one usually has to use considerably lower powers than those which would give the fastest possible separation. This is especially the case in the so-called isoelectric focusing, since the conductivity of the electrolyte is changed during the separation and, within some areas, can have very low values which implies a risk for overheating.

It is an object of the present invention to provide a method by means of which an electrophoretic separation could be performed with the highest possible power supplied without any risk for overheating.

Figure 2:
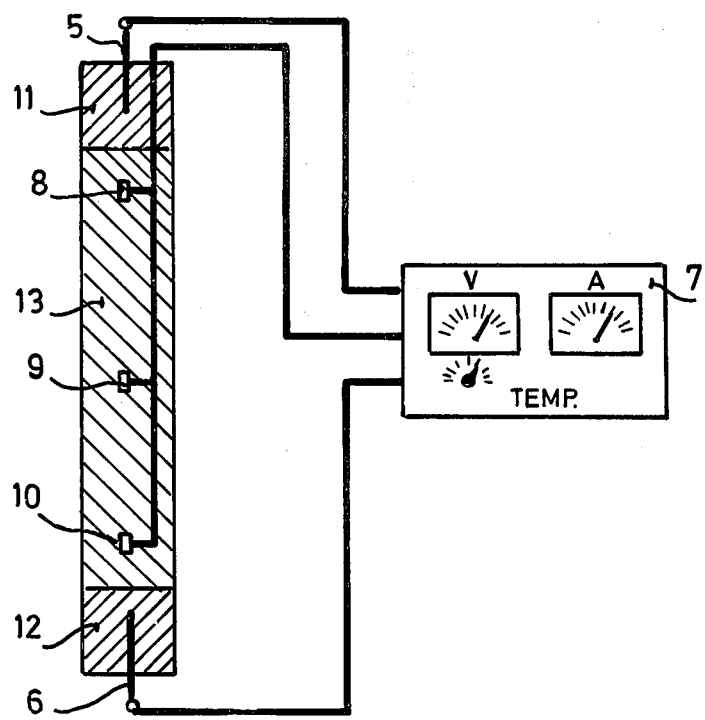

The invention will now be described in detail, reference being made to the enclosed drawing in which:

FIG. 1 schematically shows an apparatus for carrying out the method according to the invention when the separation takes place in a gel plate and, FIG. 2 schematically shows an apparatus for carrying out a method according to the invention when the separation is performed in a column.

In FIG. 1, reference 1 denotes a plate of a stabilizing medium, within which an electrophoretic separation takes place. The plate is soaked with some suitable electrolyte and arranged on a cooling plate 2. A voltage is supplied to the gel plate 1 via two electrodes 5 and 6 which are arranged in two wicks 3 and 4 respectively, made by some fibre material and soaked with the electrolyte so as to obtain a good electrical contact between the electrodes and the plate. The electrodes are connected to a power supply 7, the current and voltage applied to the electrodes being controlled according to principles to be described below. The device hitherto described is known per se, this being a configuration of electrodes often used in isoelectric focusing. In conventional electrophoresis, the electrodes are usually arranged in separate vessels with a buffer solution, these vessels being connected to the wicks 3 and 4 so as to make it possible to transfer buffer from the vessels to the wicks. The power supply used in electrophoresis is normally designed so as to make it possible to obtain either a constant voltage or a constant current. The complete experiment is then usually carried out by using one and the same value for the voltage or the current, this value being chosen so as to make sure, that at no time, the power developed in any part of the plate will be high enough to damage the sample to be separated. As stated above, this means that the current or voltage has to be set to a relatively low value which means that the separation will be relatively time-consuming.

According to the invention the plate is provided with three temperature sensing devices, i.e., thermistors, identified by numerals 8, 9, and 10 in FIG. 1, which are connected to a control input of the power supply 7. The power supply is further provided with temperature control means which are set at the highest temperature that the sample is able to withstand. Within the power supply, this temperature is then compared with the temperature values obtained from the thermistors — the current or voltage automatically being adjusted so as to make the highest temperature detected within the gel plate equal to the adjusted temperature which must not be exceeded. The setting of the voltage and current within the power supply could be performed by means known per se and will not be described in detail.

In FIG. 2, there is shown an apparatus corresponding to the apparatus according to FIG. 1 but for use within a column 13 instead of a plate. The column is then, in the same way as the plate 1 in FIG. 1, provided with a stabilizing medium soaked with an electrolyte and a sample to be separated. In the upper and lower ends of the columns two chambers, 11 and 12 respectively, are arranged. The chambers 11 and 12 are soaked with an electrolyte and contain the electrodes 5 and 6 respectively which are connected to the power supply 7 in the same way as in FIG. 1. The column is further provided with the three temperature sensing means 8, 9 and 10 from which the power supply 7 is controlled in the same way as in the apparatus according to FIG. 1.

By using the method according to the invention one will thus obtain the advantage of having the voltage and current continuously adjusted in such a way that the highest possible power is always supplied to the electrodes. This means that the separation will be considerably less time-consuming than what has hitherto been the case when the voltage or current are kept at a constant value during the complete separation.

I claim:

1. Method for performing an electrophoretic process at maximum speed, wherein an ionized sample is contained within an elongated stabilizing medium and electrical power is supplied to generate an electrical potential between first and second electrode means spaced from each other along the length of the stabilizing medium, comprising the steps of positioning a plurality of temperature sensing devices at locations spaced along the length of said stabilizing medium between said first and second electrode means, each of said devices producing a signal indicative of the temperature at its respective location, and controlling the supply of said electrical power so as to run at or near the maximum allowable current while preventing the production of a temperature at any one of said locations between the electrode means in excess of the highest temperature that the sample or medium is able to withstand.

2. Method of claim 1 which includes the steps of connecting the signals of said temperature sensing devices with control means for the supplied power which is responsive to said signals to regulate the power automatically.

3. Method according to claim 2, characterized in, that the stabilizing medium is arranged in a separation column.

4. Method according to claim 2, characterized in, that the stabilizing medium is a layer applied on a flat surface.

* * * * *